(No Model.) 2 Sheets—Sheet 1.

J. S. LEAS & J. B. CORNWALL.
SEPARATOR FOR SHELLED CORN, &c.

No. 300,715. Patented June 17, 1884.

WITNESSES
Phil C. Dieterich
H. R. Heyworth

INVENTORS
J. Silas Leas
John B. Cornwall
by J. M. Alexander Attorney

N. PETERS, Photo-Lithographer, Washington, D. C.

(No Model.) 2 Sheets—Sheet 2.

J. S. LEAS & J. B. CORNWALL.
SEPARATOR FOR SHELLED CORN, &c.

No. 300,715. Patented June 17, 1884.

WITNESSES
Phil. Dietrich
T. R. Keyworth

INVENTORS
J. Silas Leas
John B. Cornwall
by
T. M. Alexander Attorney

N. PETERS. Photo-Lithographer. Washington, D. C.

UNITED STATES PATENT OFFICE.

J. SILAS LEAS, OF ROCK ISLAND, AND JOHN B. CORNWALL, OF SOUTH MOLINE, ASSIGNORS TO THE BARNARD & LEAS MANUFACTURING COMPANY, OF MOLINE, ILLINOIS.

SEPARATOR FOR SHELLED CORN, &c.

SPECIFICATION forming part of Letters Patent No. 300,715, dated June 17, 1884.

Application filed February 7, 1884. (No model.)

*To all whom it may concern:*

Be it known that we, J. SILAS LEAS, of Rock Island, county of Rock Island, and State of Illinois, and JOHN B. CORNWALL, of South Moline, in the county of Rock Island and State of Illinois, have invented certain new and useful Improvements in Separators for Shelled Corn, &c.; and we do hereby declare that the following is a full, clear, and exact description thereof, reference being had to the accompanying drawings, and to the letters of reference marked thereon, which form part of this specification, in which—

Figure 1:
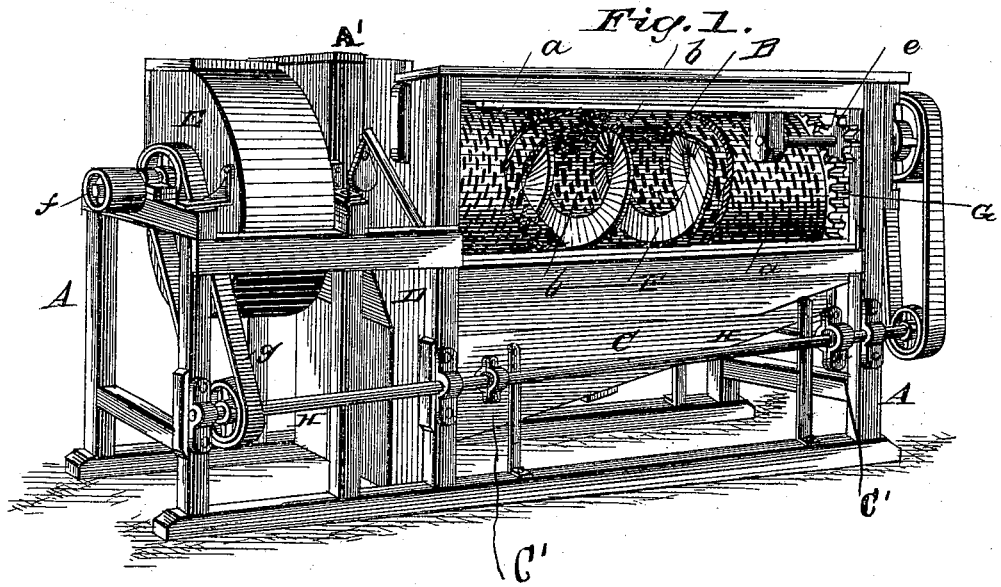
Figure 2:
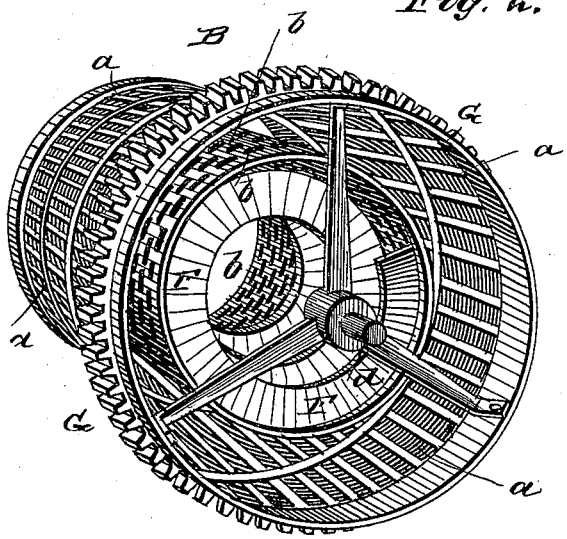
Figure 3:
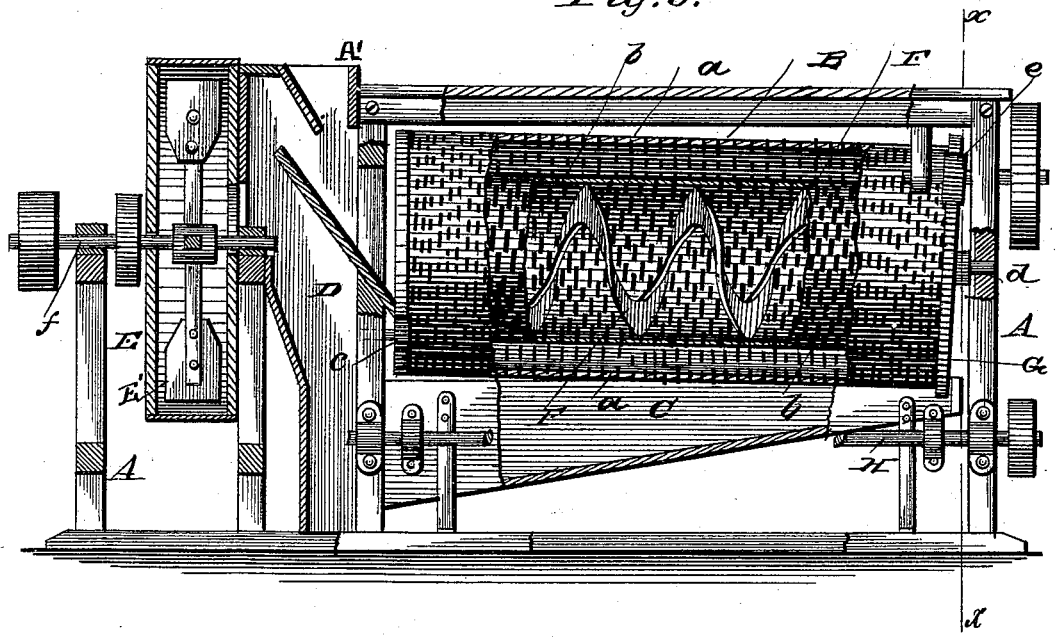
Figure 4:
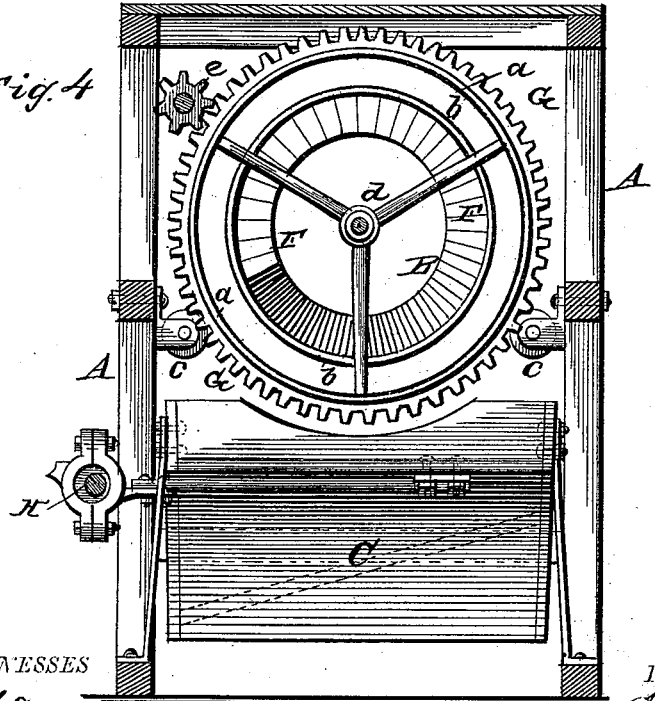

Figure 1 is a perspective view of our improved rotary separator, showing portions of the external and internal cylinders broken away, and also showing a portion of the conveyer or worm. Fig. 2 is a perspective view of the two cylinders and worm, looking from the driving end thereof. Fig. 3 is a partly-sectional view taken vertically and longitudinally through the center of the machine. Fig. 4 is a cross-section through line $xx$ of Fig. 3, indicating the anti-friction roller-bearings at one end of the outer cylinder.

The object of our invention is to thoroughly separate cobs, sticks, silk, and other foreign substances from shelled corn, and thus clean the corn for market; and it consists, essentially, in a rotary cylindrical separator having an external perforated cylinder, an internal perforated cylinder, and a worm or conveyer inside of the latter, as will be fully understood from the following description, when taken in connection with the annexed drawings.

A designates the frame of the machine, which is adapted to contain and support our improved rotary separator B. Beneath this separator is a shaking-shoe, C, operated by eccentrics C' on the shaft H, which receives the grains of corn and small pieces of cobs and conducts them down to the lower end of a separating wind-trunk, D, which is in communication with a case, E, containing a fan, E'.

The separator B consists of an outer cylinder or drum, $a$, which is numerously perforated to allow grains of corn and small pieces of cobs to pass through it. Inside of this cylinder $a$ is another cylinder or drum, $b$, of smaller diameter, which is perforated with holes of larger size than those through the outer cylinder, and which is concentrically arranged therein, so as to leave an annular space of sufficient size to allow the grain to flow freely in it. Inside of the inner cylinder is applied a worm or conveyer, F. In practice we prefer not to have a central shaft through the separator, as such a shaft would in a measure interfere with a free passage of the cobs through the cylinder $b$. We therefore support the separator on rollers $c$, applied at each end of it, or by rollers at one end and a gudgeon, $d$, journaled at the other end. The gudgeon $d$ is formed on a spider secured to the cylinders $a$ $b$.

G designates a gear which is secured to one end of the cylinder $a$, which engages a pinion spur-wheel, $e$, on the shaft of which is a pulley driven from a pulley on a shaft, H, by means of a belt, as shown in Fig. 1. The shaft H receives rotation from a pulley on the fan-shaft $f$ by means of a belt, $g$.

The operation of our separator is as follows: The corn and cobs are fed into one end of the inner cylinder through a hopper, A', and pass through a strong blast of air, which removes the sticks, chaff, and other very light matters. The worm-conveyer F moves the cobs toward the rear end of the separator and discharges them as fast as they are fed to its lower end, thus preventing them from accumulating and clogging the cylinder $b$. The shelled corn falls directly through the cylinder $b$ upon the cylinder $a$, and is thus prevented from passing out with the cobs, which would not be the case if the perforations in cylinder $b$ were not larger than those in cylinder $a$. The corn is then screened through the holes in the outer cylinder, which holes are small enough to allow the grains of corn to pass through them, but not the larger pieces of cobs, which are discharged from the rear end of the machine by the conveyer F. Very small pieces of the cobs will pass through the cylinder $a$, with the corn and fall upon the shaking-shoe, which conveys them to the separating-trunk D, where they are subjected to the action of a strong draft of air created by the fan in the case E. The corn will thus have separated from it the pieces of cob, dust, and other impurities, and it is discharged from the lower end of the separating-trunk, cleaned for the market.

If desired, we shall build the rotary separators with shafts through them, and secure the conveyers to the shafts; but we prefer, when using the machines for cleaning corn, to make them without these shafts for the reason above mentioned.

Having described our invention, what we claim as new, and desire to secure by Letters Patent, is—

The herein-described separator, comprising an outer and an inner rotary perforated cylinder, the latter having an open end, and a conveyer, a vibrating shoe, a fan, and a fan-case, and suitable gearing mechanism, all constructed and adapted to operate substantially as set forth.

In testimony that we claim the foregoing as our own we affix our signatures in presence of two witnesses.

J. SILAS LEAS. [L. S.]
JOHN B. CORNWALL. [L. S.]

Witnesses:
W. E. JOLLES,
J. S. GILLMORE.